(12) United States Patent
Oikawa et al.

(10) Patent No.: US 12,723,317 B2
(45) Date of Patent: Sep. 1, 2026

(54) CO2 CONVERSION METHOD

(71) Applicant: HONDA MOTOR CO., LTD., Tokyo (JP)

(72) Inventors: Hiroshi Oikawa, Wako (JP); Yuta Shimada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/074,505

(22) Filed: Mar. 10, 2025

(65) Prior Publication Data

US 2025/0297393 A1 Sep. 25, 2025

(30) Foreign Application Priority Data

Mar. 22, 2024 (JP) ................................ 2024-046464

(51) Int. Cl.

| | |
|---|---|
| ***C25B 3/25*** | (2021.01) |
| ***C01B 32/40*** | (2017.01) |
| ***C25B 1/04*** | (2021.01) |
| ***C25B 3/03*** | (2021.01) |
| ***C25B 15/08*** | (2006.01) |

(52) U.S. Cl.
CPC ............ *C25B 15/081* (2021.01); *C01B 32/40* (2017.08); *C25B 1/04* (2013.01); *C25B 3/03* (2021.01)

(58) Field of Classification Search
CPC ................................ C25B 3/25; C25B 15/081
USPC ........................................................ 205/462
See application file for complete search history.

(56) References Cited

U.S. PATENT DOCUMENTS 11,846,034 B1 * 12/2023 Mariano .................. C25B 9/23

FOREIGN PATENT DOCUMENTS

| | | |
|---|---|---|
| JP | 2023-527651 | 6/2023 |
| WO | 2021/225641 | 11/2021 |

* cited by examiner

*Primary Examiner* — Edna Wong
(74) *Attorney, Agent, or Firm* — Amin, Turocy & Watson, LLP

(57) ABSTRACT

A $CO_2$ conversion method includes: generating CO and $H_2O$ by a RWGS reaction from $CO_2$ and $H_2$; generating $C_2H_4$ and $H_2$ by CO electrolysis from the CO and $H_2O$; and using the $H_2$ generated by the CO electrolysis as the $H_2$ of the RWGS reaction.

3 Claims, 2 Drawing Sheets

CO2 CONVERSION METHOD

CROSS-REFERENCE TO RELATED APPLICATION

Priority is claimed on Japanese Patent Application No. 2024-046464, filed on Mar. 22, 2024, the contents of which are incorporated herein by reference.

BACKGROUND

Field of the Invention

The present invention is an invention according to a $CO_2$ conversion method.

Background

In the related art, efforts aiming at reduction of the impact on or moderation of climate change have been ongoing, and toward the realization of this purpose, research and development relating to effective utilization of $CO_2$ has been conducted.

$CO_2$ is generated by a number of industrial and biological processes. $CO_2$ is commonly discharged into air. However, since $CO_2$ is recognized as a greenhouse effect gas, it is necessary to reduce $CO_2$ discharged from these processes. $CO_2$ can be used in order to facilitate the recovery of oil and a gas from an oil well in limited cases, but most of the recovered $CO_2$ is discharged to air.

SUMMARY

In the reduction of $CO_2$ emissions, it is a problem to effectively utilize $CO_2$ as a raw material of other products without discharging $CO_2$ into air.

As a method for effectively utilizing $CO_2$, for example, a method as described in Published Japanese Translation No. 2023-527651 of the PCT International Publication is known in which $CO_2$ is converted into CO by utilizing a reverse water gas shift (RWGS) reaction ($CO_2+H_2 \rightarrow CO+H_2O$), and then a lower olefin such as ethylene ($C_2H_4$) is produced. If there are CO (carbon monoxide) generated by the RWGS reaction and hydrogen from electrolysis of water, a valuable chemical raw material can be obtained via catalytic hydrogenation from carbon monoxide to carbon hydride. However, in this method, since a reaction using a catalyst is utilized, a by-product such as methanol is generated, a step of conversion into a lower olefin is required, and therefore, there is a problem that the number of steps is increased. Further, there is a problem that the equipment cost and input energy are increased.

An aspect of the present invention aims at providing a $CO_2$ conversion method that can efficiently obtain ethylene from CO generated from a RWGS reaction. Further, the aspect of the present invention contributes to a reduction of the impact on or to moderation of climate change.

A $CO_2$ conversion method according to a first aspect of the present invention includes: generating CO and $H_2O$ by a RWGS reaction from $CO_2$ and $H_2$; generating $C_2H_4$ and $H_2$ by CO electrolysis from the CO and $H_2O$; and using the $H_2$ generated by the CO electrolysis as the $H_2$ of the RWGS reaction.

A second aspect is the $CO_2$ conversion method according to the first aspect, wherein a $C_2H_4$ current efficiency in the CO electrolysis may be 66.6% or less.

A third aspect is the $CO_2$ conversion method according to the first or second aspect, wherein the $H_2$ generated by the CO electrolysis may be used as the $H_2$ of the RWGS reaction and a heat source.

A fourth aspect is the $CO_2$ conversion method according to the third aspect, wherein the $C_2H_4$ current efficiency in the CO electrolysis may be set to be equal to or more than a value where excess $H_2$ is not generated in accordance with a $H_2$ thermal efficiency.

According to the aspect described above of the present invention, it is possible to provide a $CO_2$ conversion method that can efficiently obtain ethylene from CO generated from a RWGS reaction.

DESCRIPTION OF EMBODIMENTS

Hereinafter, embodiments of the present invention is described with reference to the drawings. The embodiments shown in the following description are merely examples, and the present invention is not necessarily limited thereto and can be appropriately modified and implemented without departing from the scope of the invention.

A $CO_2$ conversion method according to the present embodiment generates CO and $H_2O$ by a RWGS reaction from $CO_2$ and $H_2$ and generates $C_2H_4$ and $H_2$ by a CO electrolysis cell from the CO and $H_2O$.

In the RWGS reaction, the following reaction occurs. A reactor and a heat condition for the RWGS reaction are not particularly limited.

$$CO_2+H_2 \rightarrow CO+H_2O \ (\Delta H=41.2 \text{ kJ/mol})$$

In CO electrolysis, the following reaction occurs. For example, a CO electrolysis cell can be used for the CO electrolysis. A specific configuration of the CO electrolysis cell and the like are not particularly limited as long as $C_2H_4$ and $H_2$ are generated by a reaction described below. Further, $H_2O$ used in the reaction described below may be generated by the RWGS reaction or may be supplied from another supply source.

$$2CO+6H_2O+8e^- \rightarrow C_2H_4+8OH^-$$

$$2H_2O+2e^- \rightarrow H_2+2OH^-$$

In the $CO_2$ conversion method according to the present embodiment, since CO generated by the RWGS reaction can be converted into $C_2H_4$ by the CO electrolysis, it is possible to decrease the number of steps and decrease the equipment cost and the energy amount that are input.

Further, in the $CO_2$ conversion method according to the present embodiment, $H_2$ generated by the CO electrolysis is used as $H_2$ of the RWGS reaction. Thereby, it possible to omit the introduction of a water electrolysis device or the like for producing $H_2$ used in the RGWS reaction and a water electrolysis step.

Figure 1:
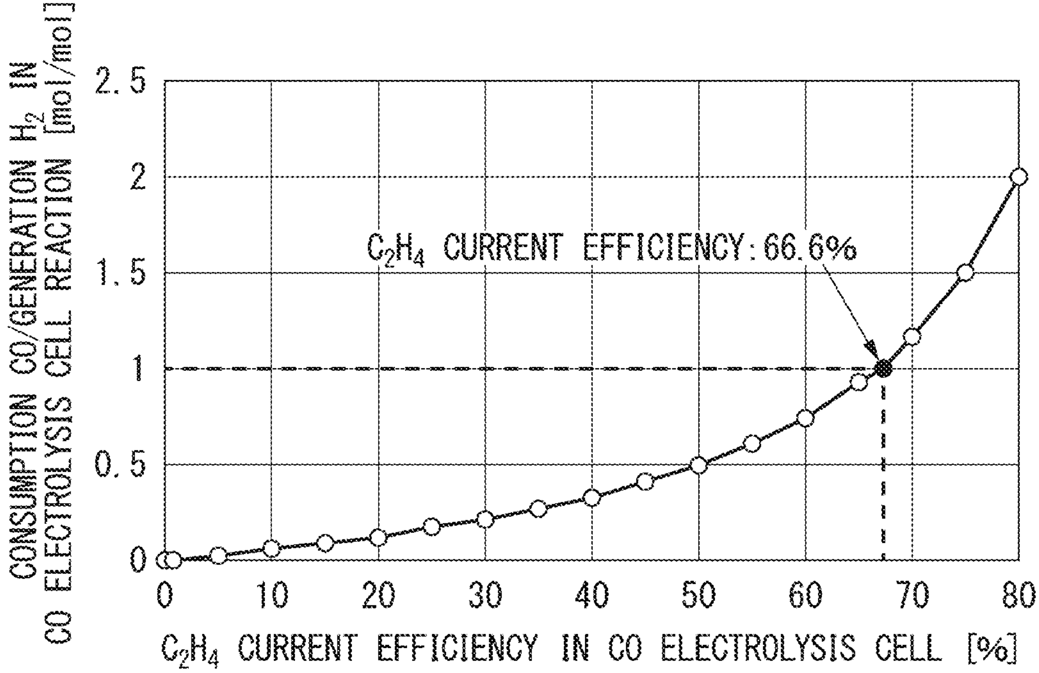
FIG. 1 is a graph showing a relationship between $C_2H_4$ current efficiency in a CO electrolysis cell and consumption CO amount/generation $H_2$ amount in the CO electrolysis cell.

FIG. 1 is a graph showing a relationship between a $C_2H_4$ current efficiency in the CO electrolysis of the CO electrolysis cell and a consumption CO amount/generation $H_2$ amount in the CO electrolysis of the CO electrolysis cell. As shown in FIG. 1, when the $C_2H_4$ current efficiency in the CO electrolysis is 66.6% (and a $H_2$ current efficiency is 33.4%), it is possible to equalize a mol amount of CO consumed by the RWGS reaction to a mol amount of $H_2$ generated by the CO electrolysis. That is, by setting the $C_2H_4$ current efficiency in the CO electrolysis is 66.6% or less (and the $H_2$ current efficiency is 33.4% or more), it is possible to cover $H_2$ required for the RWGS reaction only by $H_2$ generated by the CO electrolysis, and it is possible to perform a $CO_2$ conversion continuously without requiring the supply from another $H_2$ supply source. Therefore, the $C_2H_4$ current efficiency of the CO electrolysis cell can be preferably 66.6% or less.

$H_2$ generated by the CO electrolysis can be preferably used as a heat source of the RWGS reaction in addition to being used as $H_2$ of the RWGS reaction. Since the RWGS reaction is an endothermic reaction, a heat quantity is required for the reaction. Therefore, $H_2$ generated by the CO electrolysis is combusted and is used as a heat source of the RWGS reaction, and thereby, it becomes unnecessary to supply the heat quantity from another supply source. Thereby, it is possible to further reduce input energy for $CO_2$ conversion.

Here, the $C_2H_4$ current efficiency in the CO electrolysis can be preferably set to a value that is equal to or more than a value where excess $H_2$ is not generated in accordance with a thermal efficiency ($H_2$ thermal efficiency) when $H_2$ is used as a heat source.

When $H_2$ is used as a heat source, a $H_2$ consumption width in the $CO_2$ conversion method according to the present embodiment can be represented by the following expression.

$$RWGS \text{ endothermic enthalpy } (kJ/\text{mol}) \times \text{CO generation amount in } RWGS \text{ reaction } (\text{mol}/h) \geq H_2 \text{ combustion enthalpy } (kJ/\text{mol}) \times \text{electrolysis } H_2 \text{ generation amount } (\text{mol}/h) \times H_2 \text{ thermal efficiency } (\%)$$

Here, the RWGS endothermic enthalpy is $\Delta H=41.2$ kJ/mol, and the $H_2$ combustion enthalpy is $\Delta H=241.82$ kJ/mol.

The CO generation amount in the RWGS reaction is equal to an electrolysis CO consumption amount and is equal to an electrolysis $C_2H_4$ generation amount×2. The electrolysis $C_2H_4$ generation amount can be represented by the following expression.

$$\text{Cell current } (A) / \text{Faraday constant } ((A \cdot \text{sec.})/\text{mol} - e) \times C_2H_4 \text{ current efficiency } (\%)$$

The electrolysis $H_2$ generation amount can be represented by the following expression.

$$\text{Cell current } (A) / \text{Faraday constant } ((A \cdot \text{sec.})/\text{mol} - e) \times H_2 \text{ current efficiency } (\%)$$

Figure 2:
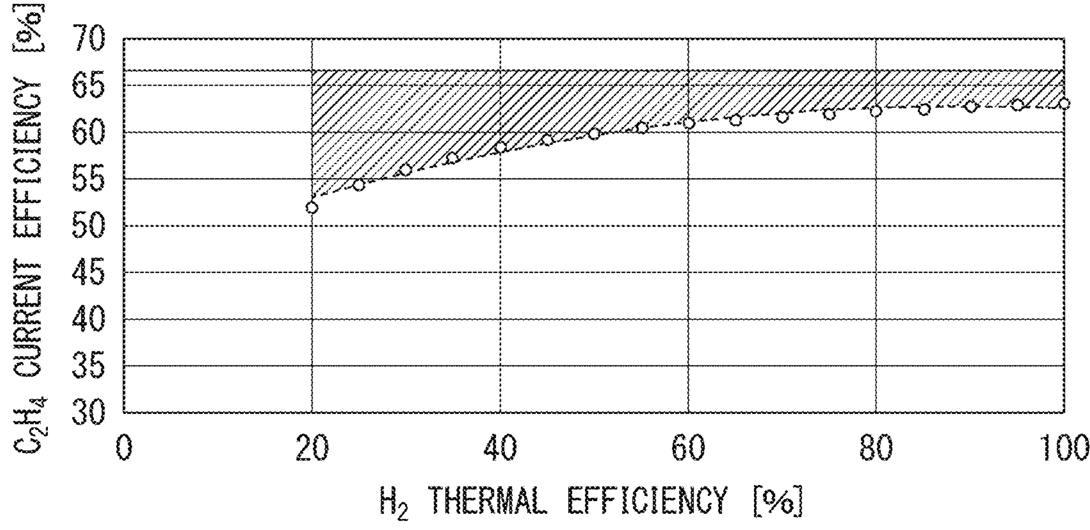
FIG. 2 is a graph showing a relationship between $H_2$ thermal efficiency and $C_2H_4$ current efficiency.

FIG. 2 shows a relationship between a $H_2$ thermal efficiency and a $C_2H_4$ current efficiency from a $H_2$ consumption width obtained by the method described above. An approximate curve shown in FIG. 2 is a curve of $y=-0.0021x^2+0.3654x+46.557$. In the case where a certain constant $H_2$ thermal efficiency is specified, when the $C_2H_4$ current efficiency in the CO electrolysis is lower than a curve in FIG. 2, excess $H_2$ is generated by the CO electrolysis. Since the excessively generated $H_2$ needs to be consumed by another device, the increase of the number of steps occurs. Therefore, the $C_2H_4$ current efficiency in the CO electrolysis can be preferably set to a value that is equal to or more than a value where excess $H_2$ is not generated in accordance with the $H_2$ thermal efficiency.

For example, when the $H_2$ thermal efficiency is 75%, as shown in FIG. 2, by setting the $C_2H_4$ current efficiency to 62.0% or more, it is possible to prevent excess $H_2$ by the CO electrolysis from being generated.

Here, when $H_2$ is combusted as a heat source, thermal energy of 241.82 kJ/mol is generated by the following reaction.

$$\tfrac{1}{2}O_2+H_2 \rightarrow H_2O \ (\Delta H=-241.82 \text{ kJ})$$

If the $H_2$ thermal efficiency when $H_2$ is used as a heat source is assumed to be 75%, a heat quantity of 241.82×0.75=181.37 kJ/mol is obtained, and in the RWGS reaction, a heat quantity of 181.37/41.2=4.4 kJ/mol per CO: 1 mol can be covered.

Figure 3:
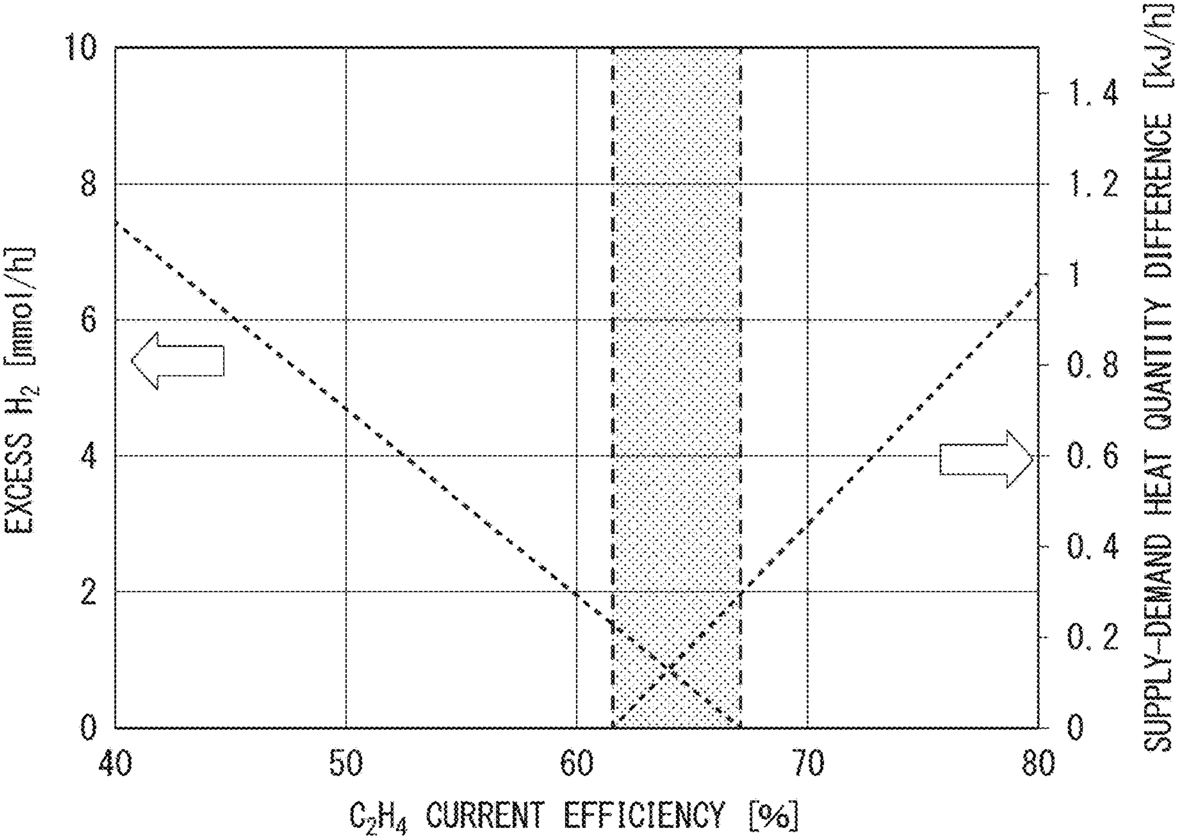
FIG. 3 is a graph showing a relationship between $C_2H_4$ current efficiency in the CO electrolysis cell and a supply-demand heat quantity difference of $H_2$ and excess $H_2$ when the $H_2$ thermal efficiency is set to 75%.

FIG. 3 shows a relationship between a $C_2H_4$ current efficiency in the CO electrolysis and a supply-demand heat quantity difference of $H_2$ and excess $H_2$ when the $H_2$ thermal efficiency is set to 75%. The positive value of the supply-demand heat quantity difference of $H_2$ indicates that a $H_2$ amount supplied from the CO electrolysis to the RWGS reaction is larger than a $H_2$ amount (both of $H_2$ used for the reaction and $H_2$ as a heat source) required for the RWGS reaction. Further, the positive value of excess $H_2$ indicates that a $H_2$ amount generated by the CO electrolysis is larger than a $H_2$ amount (excluding $H_2$ as a heat source) required for the RWGS reaction.

As shown in FIG. 3, in the case where the $H_2$ thermal efficiency when $H_2$ is used as a heat source is assumed to be 75%, by setting the $C_2H_4$ current efficiency in the CO electrolysis to 62.0 to 66.6% (and the $H_2$ current efficiency is 33.4 to 38.0%), without requiring a supply from another $H_2$ supply source, and without generating excess $H_2$ by the CO electrolysis, it is possible to further efficiently perform a $CO_2$ conversion. Therefore, when the $H_2$ thermal efficiency is set to 75%, the $C_2H_4$ current efficiency in the CO electrolysis can be preferably 62.0 to 66.6%.

What is claimed is:

1. A $CO_2$ conversion method comprising:

generating CO and $H_2O$ by a RWGS reaction from $CO_2$ and $H_2$;

generating $C_2H_4$ and $H_2$ by CO electrolysis from the CO and $H_2O$, wherein CO consumption/$H_2$ generation is in a ratio of 1 mol/1 mol; and using the $H_2$ generated by the CO electrolysis as the $H_2$ of the RWGS reaction, wherein a $C_2H_4$ current efficiency in the CO electrolysis is 66.6% or less.

2. The $CO_2$ conversion method according to claim 1, wherein the $H_2$ generated by the CO electrolysis is used as the $H_2$ of the RWGS reaction and a heat source.

3. The $CO_2$ conversion method according to claim 2, wherein a $C_2H_4$ current efficiency in the CO electrolysis is set to be equal to or more than a value where excess $H_2$ is not generated in accordance with a $H_2$ thermal efficiency.

* * * * *